UNITED STATES PATENT OFFICE.

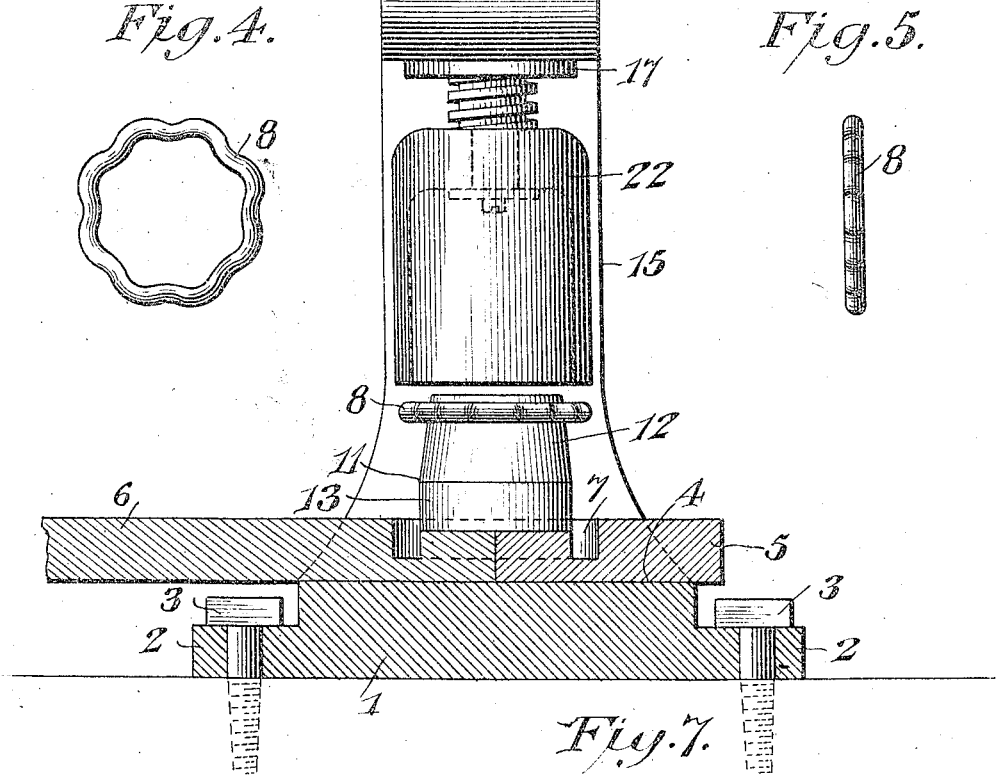

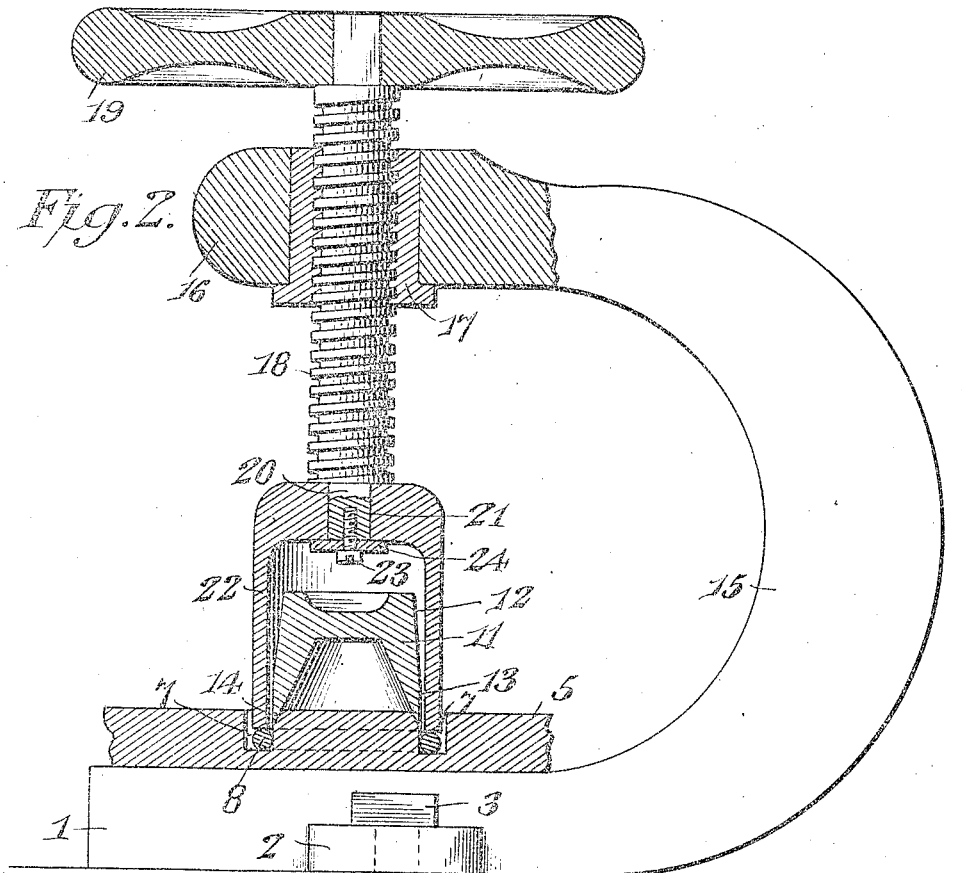
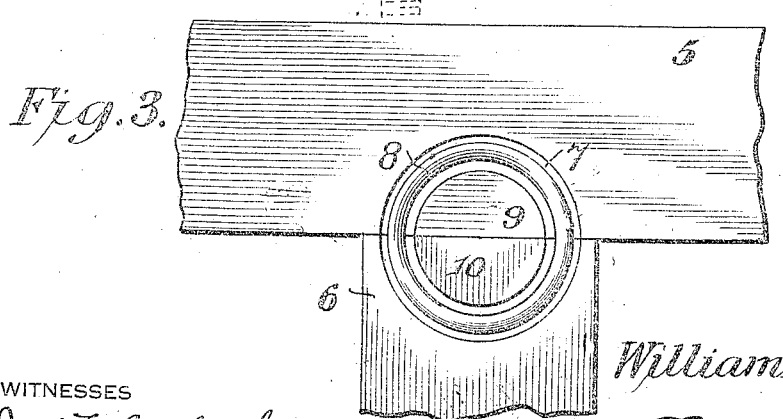

WILLIAM LEWIS EVANS, JR., OF WASHINGTON, INDIANA.

DEVICE FOR APPLYING METAL CLAMPS.

1,069,539.  Specification of Letters Patent.  Patented Aug. 5, 1913.

Application filed August 31, 1912. Serial No. 718,162.

*To all whom it may concern:*

Be it known that I, WILLIAM L. EVANS, Jr., a citizen of the United States, residing at Washington, in the county of Daviess and State of Indiana, have invented a new and useful Device for Applying Metal Clamps, of which the following is a specification.

This invention has reference to improvements in devices for applying metal clamps, especially in the form of an endless ring or loop designed to constitute the binding member of a joint. For use with the present invention the binding member is in the form of an endless ring or loop whether integrally endless or effectively so, and this loop in the finished joint is situated in a groove or channel formed or produced in the two parts to be joined together, so as to be partly included in each, and the ring is made to seat in the channel in a manner to hold the two parts together at the joint. In order to insure a rigid connection not even affected by shrinkage or swelling of the parts joined together, which shrinkage or swelling is liable to occur in wooden structures, the ring or loop is corrugated or crimped or otherwise formed, so that the free area included in the ring or loop is less than that which is included when the ring or loop is expanded, and the crimps or corrugations or other irregularities are smoothed out either wholly or to a greater or less extent, such stretching of the ring circumferentially causing a sufficient increase in the area inclosed by the ring to permit it to seat in the groove or channel provided for it, but in gripping or binding relation to the parts embraced by it, and this ring tends at all times to return toward its initial condition, thereby automatically compensating for any shrinkage of the parts without liability of loosening the grip of the ring upon the parts embraced thereby.

The present invention comprises a device or machine for applying the rings or loops to the parts to be joined together, whereby the contracted ring is stretched or expanded and then forced into the seat or groove in binding relation to the parts to be joined, and the device includes an anvil or stretching member and a follower for forcing the ring or loop along a constantly expanding portion of the anvil until the ring is sufficiently expanded to be moved into the groove or seat provided for it and as this action requires the expenditure of considerable force the device is made of ample size and strength for the purpose.

The invention will be best understood from a consideration of the following detailed description taken in connection with the accompanying drawings forming a part of this specification, with the further understanding that while a practical embodiment of the invention is disclosed in the drawings, the invention is by no means confined to any exact conformity with such showing, since the invention is susceptible of such changes and modifications which mark no material departure from the salient features of the invention as defined by the scope of the appended claims.

In the drawings:—Figure 1 is a front elevation of the device of the present invention with parts shown in vertical section. Fig. 2 is a side elevation of the structure of Fig. 1 with parts shown in vertical section and in a different position of operation than in Fig. 1. Fig. 3 is a plan view of a completed joint. Fig. 4 is a plan view of a ring or loop in its initial contact and adapted for use in connection with a machine of the present invention. Fig. 5 is an edge view of the structure of Fig. 4. Fig. 6 is a plan view of a somewhat different type of ring than shown in Fig. 4. Fig. 7 is an edge view of the structure of Fig. 6.

Referring to the drawings, there is shown a base or support 1 having ears 2 for the passage of screws 3 by means of which the device may be attached to any suitable support. The base is formed with a surface 4 designed to receive the parts to be secured together, these parts being represented in Fig. 3 as two strips 5, 6, respectively, in abutting relation and together provided with a channel or seat 7 in which is lodged a ring 8, the seat being circular in outline in the particular arrangement shown in Fig. 3 and the ring is indicated as in embracing relation to the intermediate portions 9, 10 of the two members 5 and 6 within the space inclosed by the groove 7.

The ring 8 shown separately in Figs. 4 and 5 is initially corrugated or crimped, so that the free area defined by the inner projections of the convolutions of the ring is less than the internal diameter of the groove 7 and it is only by increasing this area by smoothing out the ring until the corrugations are in part or wholly obliterated that the ring is made of sufficient size to enter the groove or seat 7 and even then the ring has still a tendency to return to its initial condition, wherefore it engages about the portions 9 and 10 of the two parts to be joined together, gripping these portions tightly and resisting all efforts to disturb the relation of the joined parts unless such efforts be powerful enough to be destructive.

In order to expand the ring 8 there is provided an anvil 11 having a frusto-conical portion 12 and a cylindrical portion 13, while the interior of the anvil is made hollow to provide an interiorly tapered edge 14 coincident with that edge of the cylindrical portion 13 remote from the tapered portion 12. By this means the anvil may slightly embrace the inner wall of the groove 7 with the cylindrical portion 13 in alinement with such inner wall.

The tapered portion 12 of the anvil 11 is of such size that its smaller end will freely receive a ring 8 in its initial condition, that is, crimped or corrugated, so that its minimum internal diameter is less than the internal diameter of the groove 7.

Rising from one end of the base 1 is an arm 15 which may curve away from the base as it rises and then curve toward the base until it terminates in a portion 16 overhanging the base at an appropriate distance above the same. Lodged in the overhang 16 is a nut 17 traversed by a screw 18, and the threads of the screw as well as those of the nut may be of the square form because of the heavy work demanded, although any particular form of thread is not obligatory. The end of the screw 18 above the overhang 16 is provided with a hand wheel 19 which may be such as is usually provided in hand presses. The lower end of the screw or screw shaft 18 is reduced in diameter, as indicated at 20, and this reduced portion is passed through one end 21 of a bell-shaped follower 22 having its other end open and of a size to fit loosely about the anvil 11 and to enter the groove 7. A screw 23 and washer 24 serve to hold the bell follower 22 to the screw shaft, so that this bell is constrained to travel axially with the shaft, but need not of necessity turn with the shaft.

The range of travel of the screw shaft with the bell is sufficient to carry the open end of the bell above the anvil, thus permitting the application of a ring 8 thereto and when the hand wheel 19 is turned in the appropriate direction the bell is forced over the anvil with the edge of its open end into engagement with a ring 8 on the anvil, and further progressive movement of the shaft 18 will cause the follower to force the ring along the anvil toward its wider end, thus expanding the ring circumferentially and to a suitable extent obliterating the corrugations or crimping until by the time the ring reaches the cylindrical portion of the anvil it is round or nearly so, and then by a further progressive movement of the follower the ring is discharged from the anvil into the seat where it tends to contract into firm engagement with the inner walls of the seat 7, gripping these walls firmly and uniting the two parts 5 and 6 of the joint so strongly that no force short of a destructive force is sufficient to disturb the relation of the two parts of the joint, while the tendency of the ring to contract toward its initial position compensates for all shrinkage. After the ring has been seated in the channel designed to receive it, the follower is withdrawn and the anvil removed, thus completing the joint so far as the connection of the two parts is concerned. Of course, any suitable means may be employed for further treatment of the joint to hide the groove and ring, or the ring may be left exposed if desired, for in some instances such display of the ring is unobjectionable. The machine is adapted for the production of blind joints, as well as visible joints, as set forth in a companion application for the joint disclosed in this application and filed on even date herewith, wherefore it is deemed unnecessary to illustrate any other type of joint than the one shown as it sufficiently demonstrates the operation of the device of the present invention.

By the term ring or loop is to be understood as meaning any closed or continuous bar, wire, strip, or the like, whether of general circular form or of polygonal form. It may be stated, however, that it would seem that the circular form is to be preferred, especially with respect to the groove or seat since said circular form of seat is very readily produced. It is not necessary that the ring 8 should be of round cross section, as indicated in Figs. 4 and 5, for it may be of other cross section, as, for instance, it may be wider than thick in a manner illustrated in Figs. 6 and 7, where a ring 8ª is shown as produced of flat metal instead of round metal, as in Figs. 4 and 5, and this flat metal ring is crimped or corrugated, so that it must be expanded in order to enter the groove or seat 7.

The endless ring or loop which the present device is designed to apply to the parts to be joined is not elastic in the sense of a split ring, which is expanded in a direction more or less diametric in order to enlarge it, and the elasticity of such split ring is depended upon to hold the parts together. Such a split ring is exceedingly weak as compared with the endless or effectively unbroken ring of the present invention, which ring must be stretched or expanded circumferentially by a force far in excess of that required to open a split ring and when applied is not only far superior in strength to a split ring but grips the joined parts with a force far in excess of that possible with a ring of like cross section when its continuity is broken at some one point to open thereat.

What is claimed is:—

1. A device for applying metal clamps, comprising an anvil having a tapered portion shaped at its smaller end to receive an endless clamp ring or loop, a follower, and means for moving the follower along the anvil to engage the ring when on the tapered portion of the anvil to stretch said ring circumferentially to enlarge its effective inclosing area, said follower having a range of movement to discharge the ring from that end of the anvil remote from the tapered portion.

2. In a device for applying metal clamps, an anvil having one end cylindrical and tapered therefrom toward the other end, and a hollow follower open at one end and having a range of movement along the anvil to and beyond the cylindrical end, said follower having an internal diameter sufficient to receive the cylindrical part of the anvil.

3. A device for the purpose described, comprising a base or support, an arm rising therefrom in overhanging relation to the base or support, a screw shaft threaded through the overhanging portion of the arm, a follower on the end of the shaft between the overhang of the arm and the base or support, and an anvil having one end cylindrical and from thence externally tapered toward the other end, the follower being open at one end and hollow and of a size to pass over the cylindrical portion of the anvil axially thereof, and said follower having a range of movement to discharge a ring placed on the tapered end of the anvil from the cylindrical portion thereof.

4. A device for the purpose described comprising a base or support, an arm rising therefrom in overhanging relation to the base or support, a screw shaft threaded through the overhanging portion of the arm, a follower on one end of the shaft between the overhang of the arm and the base or support, and an anvil having an external taper toward one end, the follower being open at one end and hollow and of a size to pass over the anvil axially thereof, said anvil having its larger end internally hollowed to form a thin edge.

5. In a device for the purpose described, a supporting expander shaped at one end to receive a contracted endless ring or loop and constructed to cause an expansion of the ring or loop when moved along said expander, and an actuator for causing movement of the ring or loop placed upon the receiving end of the expander along the latter to the other end thereof and having an extent of travel sufficient to discharge the ring or loop from that end of the expander remote from the receiving end and while said ring is in the expanded condition.

6. A device for applying expanded elastic rings or loops to work designed to receive them, comprising an expander shaped at one end to receive the contracted elastic ring or loop and at the other end hollowed out for application to the work where the ring is to be applied, and an actuator for the ring or loop having a range of movement progressively along the entire length of the expander to discharge the ring or loop from the expander while said ring is in the enlarged condition, said expander being constructed to cause the enlargement of the ring or loop during its progress along said expander.

7. In a device for the purpose described, an expander for a contracted elastic ring or loop, constructed to cause an expansion of the ring or loop during its travel along the expander, and an actuator for the ring or loop having a range of movement progressively along the entire length of the expander to cause enlargement of the ring and to then discharge it from the expander while in the enlarged condition.

8. A device for the purpose described comprising a base or support adapted to receive parts to be joined together, an arm rising from said base or support in overhanging relation thereto, a follower carried by the arm and movable toward and from the base or support, and an anvil separate from the remainder of the device and adapted to be placed upon the parts to be united, said anvil having the end adapted to engage the parts to be united straight, and the other end tapering, and the follower being shaped to pass along the anvil in embracing relation thereto and having a range of movement sufficient to force a ring placed upon the tapered portion of the anvil along the entire length of the anvil and to discharge it from that end of the anvil engaging the parts to be joined.

In testimony that I claim the foregoing as my own, I have hereunto affixed my signature in the presence of two witnesses.

WILLIAM LEWIS EVANS, Jr.

Witnesses:
LYMAN H. O'DONNELL,
AUSTIN A. TOMEY.